(12) United States Patent
Iyer et al.

(10) Patent No.: US 10,452,294 B1
(45) Date of Patent: Oct. 22, 2019

(54) SYSTEM AND METHOD OF ALLOCATING STORAGE OF DEVICES

(71) Applicant: Dell Products L.P., Round Rock, TX (US)

(72) Inventors: Shyamkumar Thiyagarajan Iyer, Austin, TX (US); Vadhiraj Sankaranarayanan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/017,189

(22) Filed: Jun. 25, 2018

(51) Int. Cl.
*G06F 12/00* (2006.01)
*G06F 3/06* (2006.01)
*G06F 13/16* (2006.01)
*G06F 13/28* (2006.01)

(52) U.S. Cl.
CPC .......... *G06F 3/0631* (2013.01); *G06F 3/0604* (2013.01); *G06F 3/0673* (2013.01); *G06F 13/1668* (2013.01); *G06F 13/28* (2013.01)

(58) Field of Classification Search
CPC .... G06F 3/0631; G06F 3/0604; G06F 3/0673; G06F 13/1668; G06F 13/28
See application file for complete search history.

(56) References Cited

U.S. PATENT DOCUMENTS

| 9,286,248 B2 * | 3/2016 | Kegel | G06F 11/3476 |
| 2008/0209130 A1 * | 8/2008 | Kegel | G06F 12/1027 |
| | | | 711/135 |
| 2009/0113110 A1 * | 4/2009 | Chen | G06F 9/45558 |
| | | | 711/6 |

OTHER PUBLICATIONS

Pinchart, Laurent. "Mastering the DMA and IOMMU APIs." Embedded Linux Conference 2014 San Jose; 102 pages.
Ben-Yehuda, Muli, et al. "The price of safety: Evaluating IOMMU performance." *The Ottawa Linux Symposium*. 2007; 14 pages.
AMD I/O Virtualization Technology (IOMMU) Specification, AMD Publication #48882, Revision 3.00, Issued Date: Dec. 2016; 270 pages.
Intel Virtualization Technology for Directed I/O, Architecture Specification, Intel Nov. 2017; 282 pages.
Abramson, Darren, et al. "Intel Virtualization Technology for Directed I/O." *Intel technology journal* 10.3 (2006); 16 pages.
AMD I/O Virtualization Technology (IOMMU) Specification, AMD Publication #48882, Revision .00, Issued Date: Mar. 24, 2011; 167 pages.

* cited by examiner

*Primary Examiner* — Matthew Bradley
(74) *Attorney, Agent, or Firm* — Baker Botts L.L.P.

(57) ABSTRACT

In one or more embodiments, one or more systems, methods, and/or processes may configure an input/output memory management unit; may receive, from a device associated with an information handling system, a request for an allocation of storage of a memory medium of the information handling system; may allocate the storage of the memory medium without an interaction with a processor of the information handling system and without an interaction with an operating system executed by the processor; may add a table entry, associated with the allocation of storage of the memory medium, to a page table; may provide update information to the operating system; may provide a success response to the device; may store first data from the device; and may provide second data to the device.

20 Claims, 6 Drawing Sheets

SYSTEM AND METHOD OF ALLOCATING STORAGE OF DEVICES

BACKGROUND

Field of the Disclosure

This disclosure relates generally to information handling systems and more particularly to allocating storage of devices associated with information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, methods, and/or processes may configure an input/output memory management unit (IOMMU); may receive, from a device associated with an information handling system, a request for an allocation of storage of a memory medium of the information handling system; may allocate the storage of the memory medium without an interaction with a processor of the information handling system and without an interaction with an operating system executed by the processor; may add a table entry, associated with the allocation of storage of the memory medium, to a page table; may provide update information to the operating system; may provide a success response to the device; may store first data from the device; and may provide second data to the device. In one or more embodiments, the information handling system may include the device, or the device may be coupled to the information handling system. In one or more embodiments, the operating system may configure the IOMMU. In one or more embodiments, one or more systems, methods, and/or processes may further provide the operating system with configuration information. For example, a device driver associated with the device may provide the operating system with configuration information. In one or more embodiments, the configuration information may include one or more of a configuration policy, at least one access control list, and at least one storage allocation limit, among others. In one or more embodiments, the request for the allocation of storage of the memory medium may include one or more of a byte alignment, a request for continuous storage, a request for storage of the memory medium that is affinitized to a first processor of multiple processors of the information handling system, and a request for storage of the memory medium that is of a cache associated with a processor of the information handling system, among others. For example, the IOMMU may allocate the storage of the memory medium based at least on the request.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, a device of an information handling system may allocate memory from an operating system executing on the information handling system. For example, the device may allocate memory from "heap" memory. In one or more embodiments, an amount of time and/or processor cycles may be consumed when the operating system allocates memory for the device. For example, a device driver may utilize one or more subroutines of the operating system to allocate memory for the device. In one or more embodiments, the operating system may map memory allocated to the device. For example, the operating system may map memory allocated to the device for one or more direct memory access (DMA) systems and/or one or more DMA processes, among others. In one or more embodiments, the operating system may retain a page table entry associated with memory associated with the one or more DMA systems and/or the one or more DMA processes. For example, the operating system may operate more efficiently without retaining the page table entry associated with memory associated with the one or more DMA systems and/or the one or more DMA processes.

In one or more embodiments, a processor of an information handling system may not configure and/or may not access the memory allocated for the device until the device has stored data to the memory allocated for the device. For example an input/output memory management unit (IOMMU) may configure memory allocated for the device. In one or more embodiments, an IOMMU may be or include a memory management unit (MMU) that may be coupled a DMA-capable input/output (I/O) bus to a memory medium. For example, an IOMMU may translate virtual addresses to physical addresses. For instance, an IOMMU may map device-visible virtual addresses (e.g., device addresses, I/O addresses, etc.) to physical addresses. In one or more embodiments, storage for a device may be allocated without being contiguous in physical memory. For example, an IOMMU may map contiguous virtual addresses to fragmented physical addresses. For instance, an IOMMU may be utilized in eliminating utilization of vectored I/O (e.g., scatter-gather lists).

In one or more embodiments, a device may not support an address space of a memory medium. For example, an IOMMU may be utilized so that the device may access the address space of the memory medium. For instance, copying buffers to and/or from a devices addressable memory space may be eliminated. In one or more embodiments, an IOMMU may provide memory protection from one or more malfunctioning devices and/or one or more malicious devices. For example, an IOMMU may not permit memory access by a device to a portion of a memory medium that is not mapped to the device. For instance, a device may not able to physically circumvent and/or corrupt configured memory management tables.

In one or more embodiments, a guest operating system may utilize hardware that is not specifically configured for virtualization. For example, a graphics card may utilize DMA, and in a virtual environment memory addresses may be re-mapped by a virtual machine and/or a hypervisor, which may cause one or more devices utilizing DMA to fail and/or malfunction. For instance, an IOMMU may manage and/or conduct a remapping that may permit and/or allow a native device driver to be utilized in a guest operating system. In one or more embodiments, an IOMMU may remap one or more hardware interrupts. In one or more embodiments, an IOMMU may provide peripheral memory paging. For example, a device utilizing a PCI-Express (PCIe) address translation services page request interface extension may determine and/or signal an urgency and/or a need of one or more memory manager services via an IOMMU.

In one or more embodiments, a device driver associated with the device may provide one or more access control lists to the operating system. In one example, an access control list may include one or more attributes associated with one or more elements of the information handling system that may be permitted to retrieve data from the memory allocated to the device. In another example, an access control list may include one or more attributes associated with one or more elements of the information handling system that may be permitted to store data to the memory allocated to the device. In one or more embodiments, the device driver may negotiate one or more security signatures. For example, a security signature may authenticate one or more elements of the information handling system for storing and/or retrieving data to and/or from the memory allocated to the device. In one or more embodiments, the device driver may configure one or more allocation limits. In one example, an allocation limit may aid in avoiding one or more starvations of one or more resources. In one example, an allocation limit may aid in preventing one or more memory denial of service attacks.

In one or more embodiments, the device may not interact with a processor of the information handling system via one or more page table entries. For example, the processor of the information handling system may utilize processor cycles for other one or more processes when the processor does not manage the one or more page table entries that are not utilized in interacting with the device. For instance, the device may utilize memory associated with one or more page table entries and communicate information with the processor via a bus.

Figure 1A:
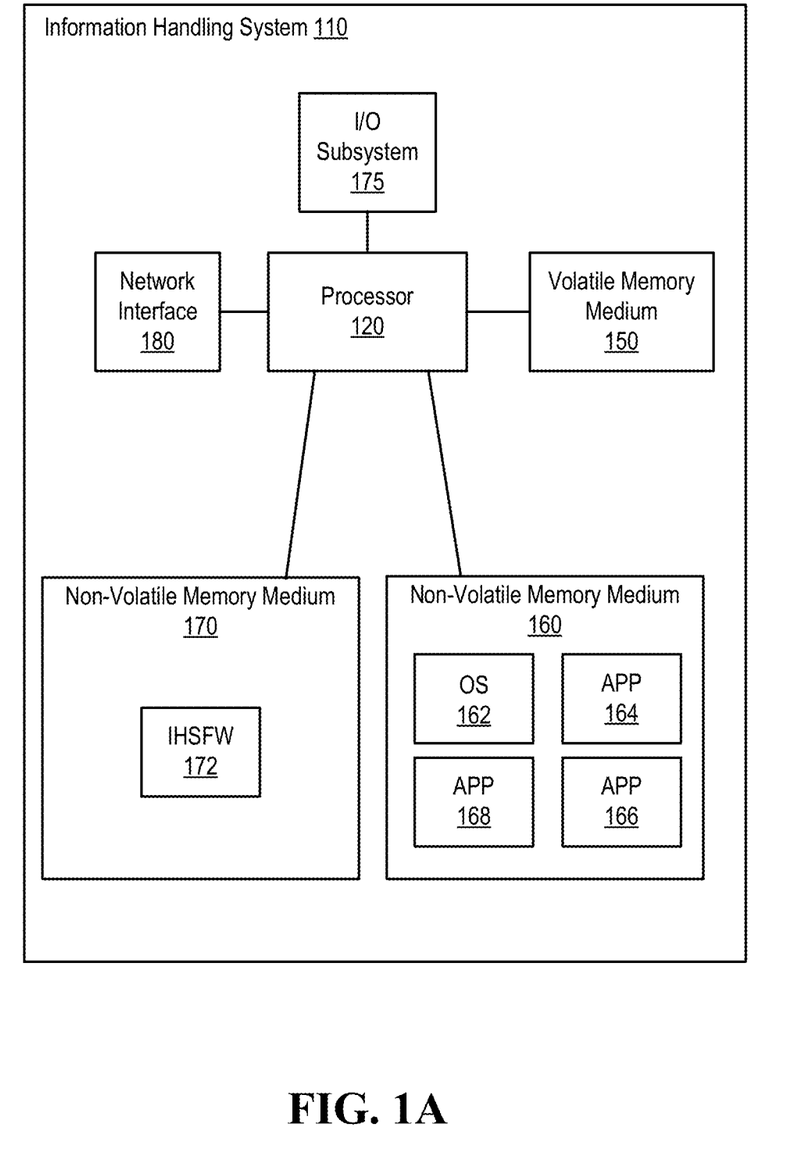
FIGS. 1A-1D illustrate examples of an information handling system, according to one or more embodiments.

Turning now to FIG. 1A, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit (I$^2$C) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, and a network interface 180. As illustrated, volatile memory medium 150, non-volatile memory media 160 and 170, I/O subsystem 175, and network interface 180 may be communicatively coupled to processor 120.

In one or more embodiments, one or more of volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCIe root complexes. In another example, one or more of an I/O subsystem 175 and a network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, flowcharts, methods, and/or processes described herein. In one example, processor 120 may execute processor instructions from one or more of memory media 150-170 in implementing one or more systems, flowcharts, methods, and/or processes described herein. In another example, processor 120 may execute processor instructions via network interface 180 in implementing one or more systems, flowcharts, methods, and/or processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150-170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, processor 120 and one or more components of IHS 110 may be included in a system-on-chip (SoC). For example, the SoC may include processor 120 and a platform controller hub (not specifically illustrated).

Figure 1B:
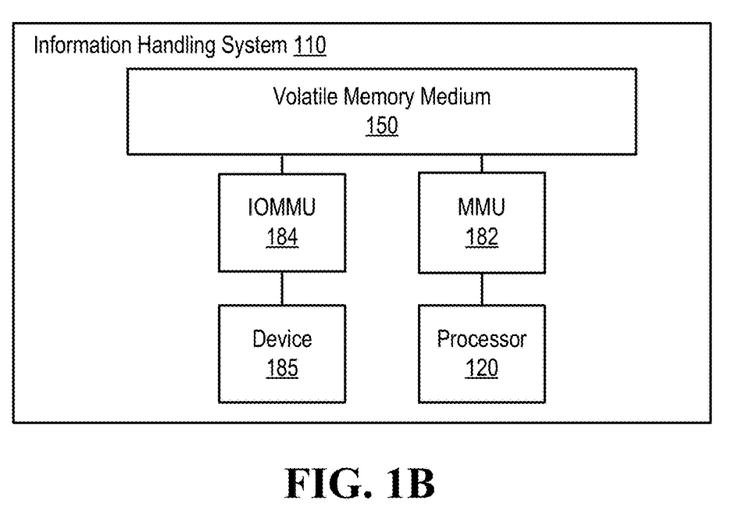
Figure 1C:
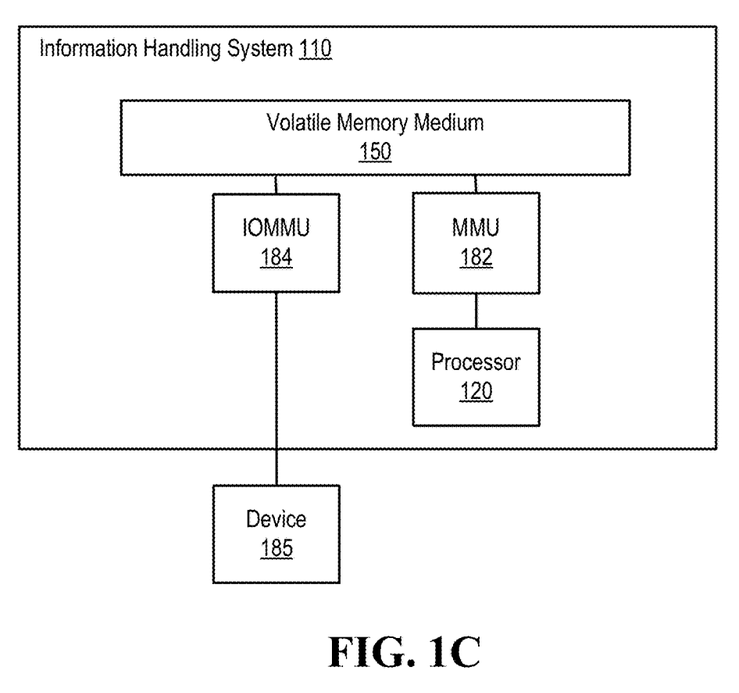

Turning now to FIGS. 1B and 1C, examples of a device coupled to an input/output memory management unit are illustrated, according to one or more embodiments. As shown, processor 120 may be coupled to a memory management unit (MMU) 182, which may be coupled to volatile memory medium 150. As illustrated, a device 185 may be coupled to an IOMMU 184, which may be coupled to volatile memory medium 150. In one or more embodiments, an information handling system may include a device. For example, IHS 110 may include device 185, as shown in FIG. 1B. In one or more embodiments, a device may be coupled to an information handling system. For example, device 185 may be coupled to IHS 110, as illustrated in FIG. 1C. In one or more embodiments, device 185 may be or include one or more of a graphics processing unit (GPU), a PCIe device, a storage device, a dock device (e.g., a docking station), a device coupled to a docking station, a USB device, a SAS device, and an I/O device, among others.

Figure 1D:
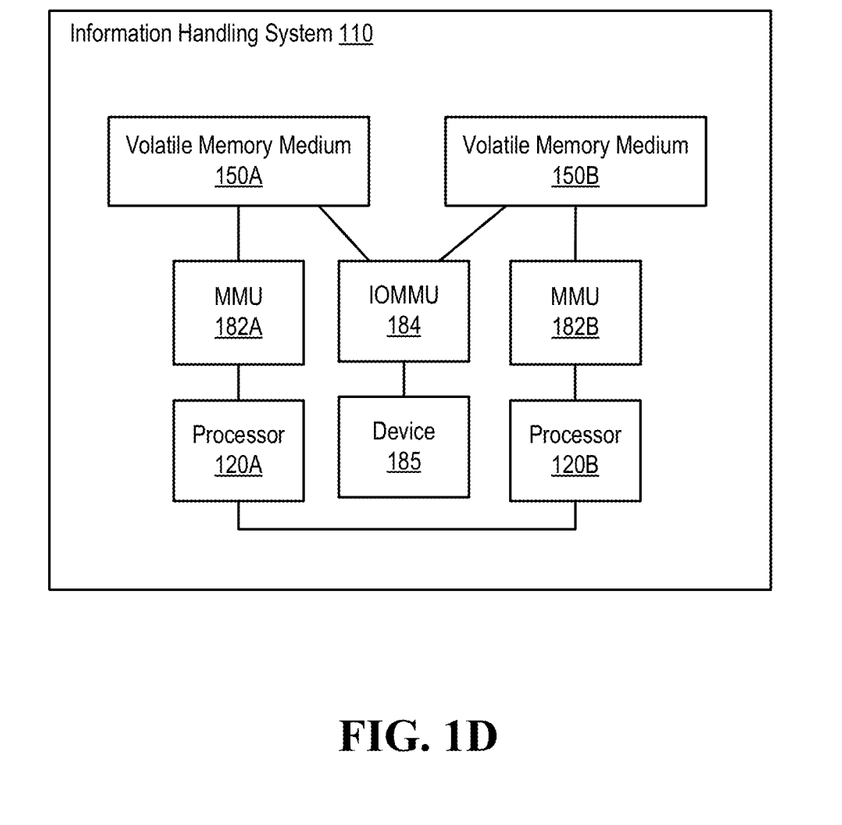

Turning now to FIG. 1D, an example of a device and multiple processors is illustrated, according to one or more embodiments. As shown, a processor 120A may be coupled to a MMU 182A, which may be coupled to a volatile memory medium 150A. As illustrated, a processor 120B may be coupled to a MMU 182B, which may be coupled to a volatile memory medium 150B. As shown, processor 120A may be communicatively coupled to processor 120B. In one or more embodiments, processor 120A may be communicatively coupled to processor 120B via a memory medium. For example, processor 120A may be communicatively coupled to processor 120B via a cache. In one instance, the cache may be or include a level one cache. In a second instance, the cache may be or include a level two cache. In another instance, the cache may be or include a level three cache. As illustrated, device 185 may be coupled to IOMMU 184, which may be coupled to volatile memory media 150A and 150B.

In one or more embodiments, device 185 may provide and/or receive data to and/or from a processor via a memory medium. In one example, device 185 may provide and/or receive data to and/or from processor 120A via memory medium 150A. In another example, device 185 may provide and/or receive data to and/or from processor 120A via memory medium 150B. For instance, processor 120A may provide and/or receive data to and/or from medium 150B via processor 120B.

In one or more embodiments, IOMMU 184 may allocate storage from medium 150A when device 185 may provide and/or receive data to and/or from processor 120A. For example, allocating storage from medium 150A when device 185 may provide and/or receive data to and/or from processor 120A may reduce communication overhead. For instance, processor 120B may not be involved in providing and/or receiving data to and/or from processor 120A and device 185. In one or more embodiments, allocating storage from medium 150A when device 185 may provide and/or receive data to and/or from processor 120A may reduce one or more data storage and/or retrieval latencies.

Figure 2A:
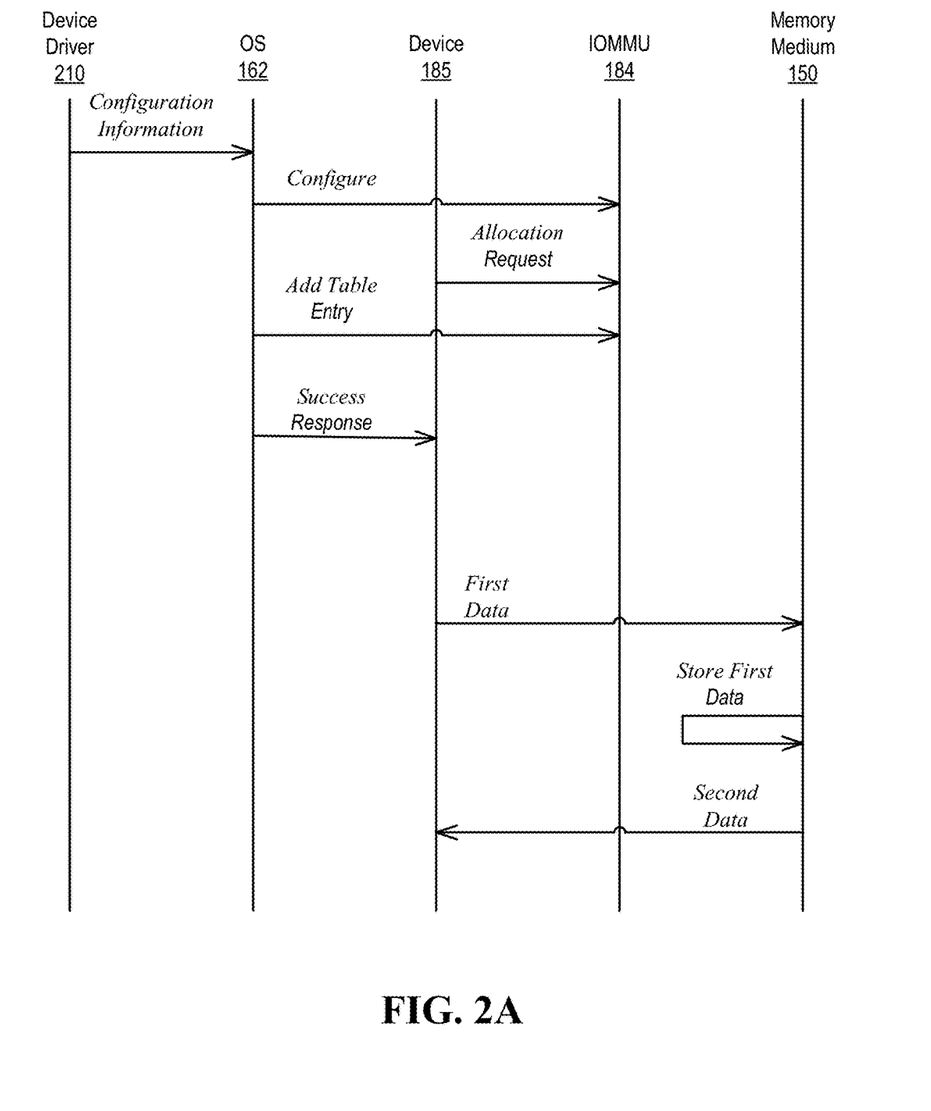
FIG. 2A illustrates an example of a sequence, according to one or more embodiments.

Turning now to FIG. 2A, an example of a sequence is illustrated, according to one or more embodiments. As shown, a device driver 210 may provide configuration information to OS 162. In one or more embodiments, the configuration information may include a configuration policy, one or more access control lists, and/or one or more storage allocation limits, among others. As illustrated, device 185 may provide an allocation request to IOMMU 184. For example, the allocation request may include a PCIe address translation request. In one or more embodiments, the allocation request may be or include a memory page allocation request. In one or more embodiments, the allocation request may include a page allocation request message. For example, the page allocation request message may be or include a PCIe address translation request. In one or more embodiments, the allocation request may be passed through IOMMU 184 to OS 162.

As shown, OS 162 may add a page table entry to IOMMU 184. In one or more embodiments, a page table may be or include a data structure utilized by a virtual memory system in an information handling system to store a mapping between virtual addresses and physical addresses. In one example, virtual addresses may be utilized by an application (e.g., an APP of APPs 164-168) and/or a process, among others. In another example, physical addresses may be utilized by hardware elements of an information handling system. In one or more embodiments, a page table entry may be or include at least one mapping between a virtual address and a physical address.

As illustrated, OS 162 may provide a success response to device 185. In one or more embodiments, the success response may include information indicating that the allocation request was successful. As illustrated, device 185 may provide first data to memory medium 150. As shown, memory medium 150 may store the first data. As illustrated, memory medium 150 may provide second data to device 185. In one example, the second data may be the first data. In another example, the second data may be different from the first data.

Figure 2B:
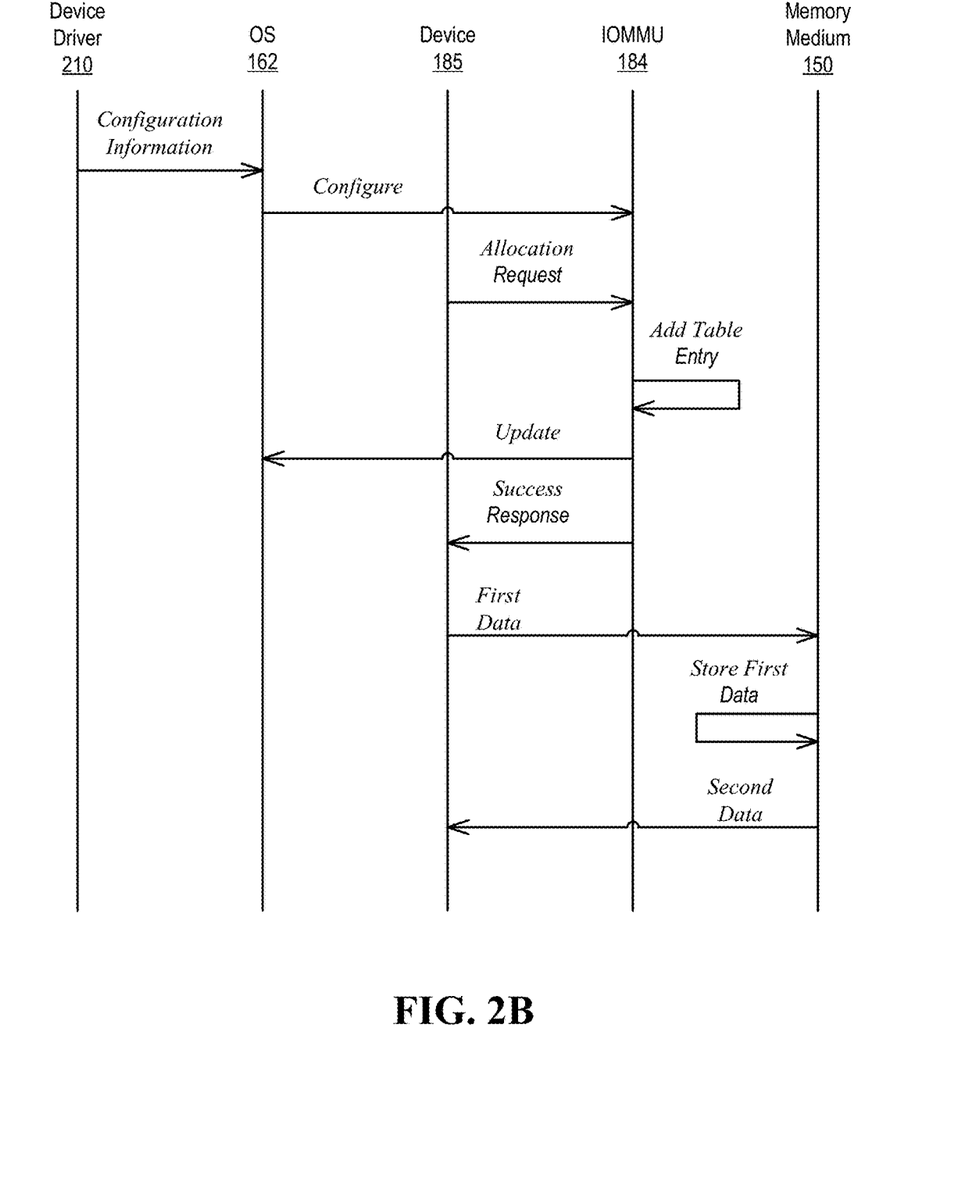
FIG. 2B illustrates an example of another sequence, according to one or more embodiments.

Turning now to FIG. 2B, an example of another sequence is illustrated, according to one or more embodiments. As shown, device driver 210 may provide configuration information to OS 162. In one or more embodiments, the configuration information may include a configuration policy, one or more access control lists, and/or one or more storage allocation limits, among others. As illustrated, OS 162 may configure IOMMU 184. In one or more embodiments, OS 162 may configure IOMMU 184 based at least on the configuration information.

As shown, device 185 may provide an allocation request to IOMMU 184. In one or more embodiments, the allocation request may include a page allocation request message. For example, the page allocation request message may be or include a PCIe address translation request. As illustrated, IOMMU 184 may add a page table entry.

In one or more embodiments, a page table may be or include a data structure utilized by a virtual memory system in an information handling system to store a mapping between virtual addresses and physical addresses. In one example, virtual addresses may be utilized by an application (e.g., an APP of APPs 164-168) and/or a process, among others. In another example, physical addresses may be utilized by hardware elements of an information handling system. In one or more embodiments, a page table entry may be or include at least one mapping between a virtual address and a physical address.

As shown, IOMMU 184 may provide an update to OS 162. In one or more embodiments, OS 162 may utilize the update to update one or more data structures. For instance, OS 162 may update one or more page tables. For instance, the one or more page tables may be or include one or more processor page tables. In one or more embodiments, IOMMU 184 may update one or more data structures. For example, IOMMU 184 may update one or more data structures utilized by OS 162. For instance, the one or more data structures utilized by OS 162 may include storage allocations and/or statistical information about utilization of storage allocated by IOMMU 184. In one or more embodiments, OS 162 may utilize the one or more data structures in allocating storage. For example, OS 162 may utilize the one or more data structures in allocating storage for one or more applications and/or one or more processes, among others.

As illustrated, IOMMU 184 may provide a success response to device 185. In one or more embodiments, the success response may include information indicating that the allocation request was successful. As shown, device 185 may provide first data to memory medium 150. As illustrated, memory medium 150 may store the first data. As shown, memory medium 150 may provide second data to device 185. In one example, the second data may be the first data. In another example, the second data may be different from the first data.

Figure 3:
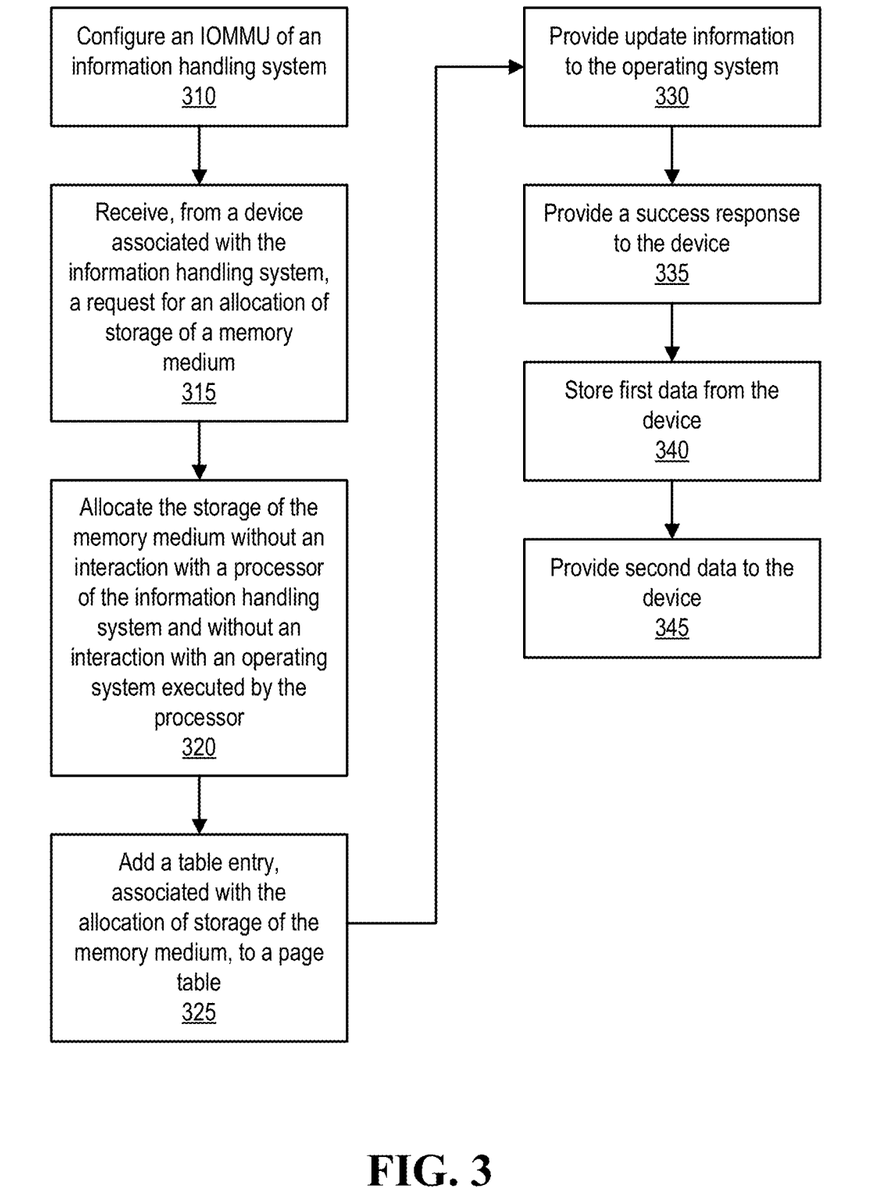
FIG. 3 illustrates an example of a method of operating an information handling system, according to one or more embodiments.

Turning now to FIG. 3, an example of a method of operating an information handling system is illustrated, according to one or more embodiments. At 310, an IOMMU of an information handling system may be configured. For example, IOMMU 184 may be configured. For instance, OS 162 may configure IOMMU 184. At 315, a request for an allocation of storage of a memory medium may be received. For example, IOMMU 184 may receive, from device 185, a request for an allocation of storage of memory medium 150.

In one or more embodiments, the request for the allocation of the storage of the memory medium may include one or more attributes. In one example, the one or more attributes may include a specification that the storage of the memory medium is continuous. In a second example, the one or more attributes may include a specification that the storage of the memory medium includes a byte alignment. For instance, the byte alignment may include a four byte alignment, an eight byte alignment, a sixteen byte alignment, etc. In a third example, the one or more attributes may include a specification that the storage of the memory medium is cache optimized. For instance, the storage of the memory medium that is cache optimized may include a byte alignment that is optimized for data transfer to and/or from a cache. In a fourth example, the one or more attributes may include a specification that the storage of the memory medium is affinitized to a first processor of multiple processors. For instance, storage of memory medium 150A may be affinitized to processor 120A of multiple processors 120A and 120B. In another example, the one or more attributes may include a specification that the storage of the memory medium is of a cache associated with a processor. For instance, the one or more attributes may include a specification that the storage of the memory medium is of a level one cache of processor 120, a level two cache of processor 120, a level three cache of processor 120, etc.

At 320, storage of the memory medium may be allocated without an interaction with a processor of the information handling system and without an interaction with an operating system executed by the processor. For example, IOMMU 184 may allocate storage of memory medium 150 without an interaction with a processor 120 and without an interaction with OS 162. In one or more embodiments, the allocation of the storage of the memory medium may be based at least on the one or more attributes of the request for the allocation of storage of the memory medium. In one example, the allocation of the storage of the memory medium may be continuous. In a second example, the allocation of the storage of the memory medium may include a byte alignment. For instance, the byte alignment may include a four byte alignment, an eight byte alignment, a sixteen byte alignment, etc. In a third example, the allocation of the storage of the memory medium may be cache optimized. For instance, the storage of the memory medium that is cache optimized may include a byte alignment that is optimized for data transfer to and/or from a cache. In a fourth example, the allocation of the storage of the memory medium may be affinitized to a first processor of multiple processors. For instance, storage of memory medium 150A may be affinitized to processor 120A of multiple processors 120A and 120B. In a fourth example, the allocation of the storage of the memory medium may be of a cache associated with a processor. For instance, the allocation of the storage of the memory medium may be of a level one cache of processor 120, a level two cache of processor 120, a level three cache of processor 120, etc.

At 325, a table entry associated with the allocation of storage of the memory medium may be added to a page table. For example, IOMMU 184 may add a table entry associated with the allocation of storage of the memory medium to a page table. At 330, update information may be provided to the operating system. For example, IOMMU 184 may provide update information to OS 162. In one or more embodiments, the update information may include information associated with the page table entry added to the page table. In one example, the information associated with the page table entry added to the page table may indicate a size of the allocation of storage of the memory medium. In another example, the information associated with the page table entry added to the page table may indicate that the page table entry was added to the page table.

At 335, a success response may be provided to the device. For example, IOMMU 184 may provide a success response to device 185. At 340, the memory medium may store first data from the device. For example, the memory medium may store the first data via the allocation of storage. For instance, memory medium 150 may store first data from device 185 via the allocation of storage. At 345, the memory medium may provide second data to the device. For example, memory medium 150 may provide, from the allocation of storage, second data to device 185. In one instance, the second data may be different from the first data. In another instance, the second data may be the first data. In one or more embodiments, the second data may include a portion of the first data.

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, systems, methods, and/or processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
    at least one processor;
    a memory medium, coupled to the at least one processor, that stores instructions executable by the at least one processor; and
    an input/output memory management unit (IOMMU) coupled to the memory medium;
    wherein, when instructions are executed by the at least one processor, the information handling system is caused to:
        configure the IOMMU;
    wherein the IOMMU is configured to:
        receive, from a device associated with the information handling system, a request for an allocation of storage of the memory medium;
        allocate the storage of the memory medium without an interaction with the at least one processor and without an interaction with an operating system executed by the at least one processor;
        add a table entry, associated with the allocation of storage of the memory medium, to a page table;
        provide update information to the operating system; and
        provide a success response to the device; and
    wherein the memory medium is configured to:
        store first data from the device; and
        provide second data to the device.

2. The information handling system of claim 1, further comprising:
    the device.

3. The information handling system of claim 1,
    wherein the instructions include the operating system; and
    wherein, to configure the IOMMU, the operating system causes the information handling system to further configure the IOMMU.

4. The information handling system of claim 1,
    wherein the instructions include a device driver associated with the device; and
    wherein the device driver further causes the information handling system to provide the operating system with configuration information.

5. The information handling system of claim 4, wherein the configuration information includes one or more of a configuration policy, at least one access control list, and at least one storage allocation limit.

6. The information handling system of claim 1, wherein the request for the allocation of storage of the memory medium includes a byte alignment.

7. The information handling system of claim 1, wherein the request for the allocation of storage of the memory medium includes a request for continuous storage.

8. A method, comprising:
    configuring an input/output memory management unit (IOMMU) of an information handling system;
    the IOMMU receiving, from a device associated with the information handling system, a request for an allocation of storage of a memory medium of the information handling system;
    the IOMMU allocating the storage of the memory medium without an interaction with a processor of the information handling system and without an interaction with an operating system executed by the processor;
    the IOMMU adding a table entry, associated with the allocation of storage of the memory medium, to a page table;
    the IOMMU providing update information to the operating system;
    the IOMMU providing a success response to the device;
    the memory medium storing first data from the device; and
    the memory medium providing second data to the device.

9. The method of claim 8, wherein the information handling system includes the device.

10. The method of claim 8, wherein the configuring the IOMMU includes the operating system configuring the IOMMU.

11. The method of claim 8, further comprising:
    a device driver associated with the device providing the operating system with configuration information.

12. The method of claim 11, wherein the configuration information includes one or more of a configuration policy, at least one access control list, and at least one storage allocation limit.

13. The method of claim 8, wherein the request for the allocation of storage of the memory medium includes a byte alignment.

14. The method of claim 8, wherein the request for the allocation of storage of the memory medium includes a request for continuous storage.

15. An input/output memory management unit of an information handling system, configured to:
    receive, from a device associated with the information handling system, a request for an allocation of storage of a memory medium of the information handling system;
    allocate the storage of the memory medium without an interaction with a processor of the information handling system and without an interaction with an operating system executed by the processor;
    add a table entry, associated with the allocation of storage of the memory medium, to a page table;
    provide update information to the operating system; and
    provide a success response to the device.

16. The input/output memory management unit of claim 15, wherein the input/output memory management unit is further configured to receive configuration information from an operating system.

17. The input/output memory management unit of claim 15,
- wherein the request for the allocation of storage of the memory medium includes a byte alignment; and
- wherein, to allocate the storage of the memory medium, the input/output memory management unit is further configured to allocate the storage of the memory medium that is associated with the byte alignment.

18. The input/output memory management unit of claim 15,
- wherein the request for the allocation of storage of the memory medium includes a request for continuous storage; and
- wherein, to allocate the storage of the memory medium, the input/output memory management unit is further configured to allocate the storage of the memory medium that is continuous.

19. The input/output memory management unit of claim 15,
- wherein the request for the allocation of storage of the memory medium includes a request for storage of the memory medium that is affinitized to a first processor of multiple processors of the information handling system; and
- wherein, to allocate the storage of the memory medium, the input/output memory management unit is further configured to allocate the storage of the memory medium that is affinitized to the first processor.

20. The input/output memory management unit of claim 15,
- wherein the request for the allocation of storage of the memory medium includes a request for storage of the memory medium that is of a cache associated with a processor of the information handling system; and
- wherein, to allocate the storage of the memory medium, the input/output memory management unit is further configured to allocate the storage of the memory medium that is the cache associated with the processor of the information handling system.

* * * * *